United States Patent [19]
Tarumi et al.

[11] Patent Number: 5,599,480
[45] Date of Patent: Feb. 4, 1997

[54] LIQUID-CRYSTALLINE MEDIUM

[75] Inventors: Kazuaki Tarumi, Seeheim; Matthias Bremer, Darmstadt, both of Germany

[73] Assignee: Merck Patent Gesellschaft Mit Beschrankter Haftung, Darmstadt, Germany

[21] Appl. No.: 508,100

[22] Filed: Jul. 27, 1995

[30] Foreign Application Priority Data

Jul. 28, 1994 [DE] Germany .......................... 44 26 798.3
Aug. 11, 1994 [DE] Germany .......................... 44 28 478.0
Dec. 15, 1994 [DE] Germany .......................... 44 44 813.9

[51] Int. Cl.$^6$ .......................... C09K 19/30; C09K 19/52; G02F 1/13
[52] U.S. Cl. ................... 252/299.63; 252/299.01; 252/299.66; 349/182
[58] Field of Search .................. 252/299.01, 299.61, 252/299.66

[56] References Cited

U.S. PATENT DOCUMENTS

| | | | |
|---|---|---|---|
| 4,897,216 | 1/1990 | Reiffenrath et al. | 252/299.63 |
| 5,236,620 | 8/1993 | Reiffenrath et al. | 252/299.61 |
| 5,279,764 | 1/1994 | Reiffenrath et al. | 252/299.66 |

FOREIGN PATENT DOCUMENTS 3807872  9/1989  Germany .

*Primary Examiner*—Shean C. Wu
*Attorney, Agent, or Firm*—Millen, White, Zelano & Branigan, P.C.

[57] ABSTRACT

The invention relates to a liquid-crystalline medium based on a mixture of polar compounds having negative dielectric anisotropy, which contains at least 1 compound of the formula I

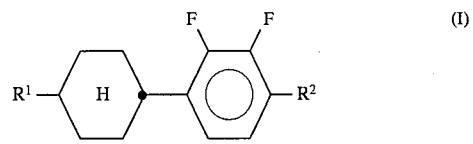

in which $R^1$ and $R^2$ are each, independently of one another, H, an unsubstituted alkyl or alkenyl radical having up to 18 carbon atoms in which one or more non-adjacent $CH_2$ groups may be replaced by a radical selected from the group consisting of —O—, —S—, and —C≡C—, and the use thereof for active matrix displays based on the ECB effect.

14 Claims, No Drawings

LIQUID-CRYSTALLINE MEDIUM

BACKGROUND OF THE INVENTION

The invention relates to a liquid-crystalline medium based on a mixture of polar compounds having negative dielectric anisotropy, which contains at least 1 compound of the formula I

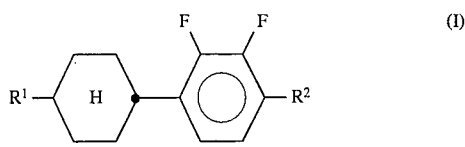

in which $R^1$ and $R^2$ are each, independently of one another,

H, an unsubstituted alkyl or alkenyl radical having up to 18 carbon atoms in which one or more non-adjacent $CH_2$ groups may be replaced by a radical selected from the group consisting of —O—, —S— and —C≡C—, in particular for electro-optical displays having active matrix addressing based on the ECB effect.

The principle of electrically controlled birefringence, the ECB effect, or the DAP effect (deformation of aligned phases) was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

Papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy n and values for the dielectric anisotropy of −0.5 to −5 in order to be usable for high-information display elements based on the ECB effect. Electro-optical display elements based on the ECB effect have homeotropic edge alignment.

The industrial application of this effect in electro-optical display elements requires LC phases which must satisfy a multiplicity of requirements. Particularly important here are chemical resistance to moisture, air and physical effects such as heat, radiation in the infra-red, visible and ultra-violet regions and direct and alternating electrical fields. Furthermore, LC phases which can Be used industrially need a liquid-crystalline mesophase in a suitable temperature range and low viscosity.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having substantially negative dielectric anisotropy and adequate long-term stability were hitherto not available.

Matrix liquid-crystal displays (MLC displays) are known. Examples of nonlinear elements which can be used to individually switch the individual pixels are active elements (i.e. transistors). This is then referred to as an "active matrix", and a differentiation can be made between two types:

1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joins.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The, TFT matrix is applied to the inside of one glass plate of the display, while the inside of the other glass plate carries the transparent counterelectrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back.

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORIMACHI K., TAJIMA, E., WATANABE, H., SHIMIZU, H., Proc. Eurodisplay 84, Sept. 1984: A 210–288 Matrix LCD Controlled by Double Stage Diode Rings, p. 141 ff, Paris; STROMER, M., Proc. Eurodisplay 84, Sept. 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

The, disadvantage of the MLC-TN displays disclosed hitherto is due to their comparatively low contrast, the relatively high viewing angle dependence and the difficulty of producing grey shades in these displays.

EP 0 474 062 discloses MLC displays based on the ECB effect. The LC mixtures described therein are based on 2,3-difluorophenyl derivatives containing an ester, ether or ethyl bridge and have low values for the "voltage holding ratio" (HR) after exposure to UV.

Thus, there continues to be a great demand for MLC displays having very high resistivity at the same time as a wide operating temperature range, short response times and low threshold voltage, with the aid of which various grey shades can be produced.

The invention has the object of providing MLC displays based on the ECB effect which do not have the abovementioned disadvantages, or do so only to a reduced extent, and at the same time have very high resistivities.

SUMMARY OF THE INVENTION

It has now been found that this object can be achieved if nematic liquid-crystal mixtures containing at least one compound of the formula I

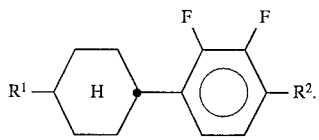

The invention thus relates to a liquid-crystalline medium based on a mixture of polar compounds having negative dielectric anisotropy, which contains at least 1 compound of the formula I

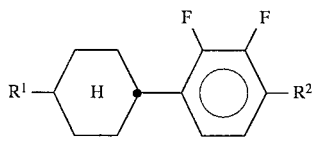

in which $R^1$ and $R^2$ are each, independently of one another,

H, an unsubstituted alkyl or alkenyl radical having up to 18 carbon atoms in which one or more non-adjacent $CH_2$ groups may be replaced by a radical selected from the group consisting of —O—, —S—, and —C≡C—, in particular additionally containing one or more compounds of the formula II

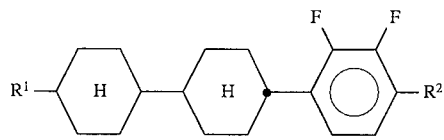

in which $R^1$ and $R^2$ are as defined above.

Preferred embodiments are:

a) A medium which additionally contains one or more compounds of the formula III:

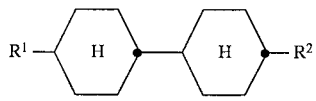

in which $R^1$ and $R^2$ each, independently of one another, have one of the meanings given in claim 1 above.

b) A medium which essentially comprises 4 or more compounds selected from the formulae I and II and two or more compounds of the formula III.

c) A medium containing at least 2 compounds of the formula I.

d) A medium in which the proportion of compounds of the formula I in the mixture as a whole is at least 15% by weight.

e) A medium in which the proportion of compounds of the formula II in the mixture as a whole is at least 30% by weight.

f) A medium in which the proportion of compounds of the formula III in the mixture as a whole is from 10 to 50% by weight.

g) A liquid-crystalline medium containing at least 2 compounds selected from the formulae IIIa and IIIb

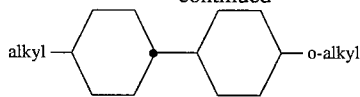

in which alkyl is $C_{1-6}$-alkyl, in particular containing at least 1 compound of the formula IIIa and at least 1 compound of the formula IIIb.

h) A liquid-crystalline medium essentially comprising:
15–30% by weight of one or more compounds of the formula I,
30–70% by weight of one or more compounds of the formula II and
10–50% by weight of one or more compounds of the formula III.

The invention furthermore relates to an electrooptical display having active matrix addressing based on the ECB effect, characterized in that it contains, as dielectric, a liquid-crystalline medium as described above.

The liquid-crystal mixture preferably has a nematic phase range of at least 60K and a maximum viscosity of 30 mPa.s at 20° C.

The liquid-crystal mixture according to the invention has a $\Delta\epsilon$ of from about –0.5 to –5, in particular from about –3.0 to –4.5, where $\Delta\epsilon$ denotes the dielectric anisotropy.

The birefringence $\Delta n$ in the liquid-crystal mixture is generally between 0.04 and 0.10, preferably between 0.05 and 0.09, and/or the dielectric constant $\epsilon_{51\ |}$ is greater than or equal to 3, preferably from 3.2 to 8.5.

In a further preferred embodiment, the media according to the invention contain
at least one compound of the formula I,
at least one compound of the formula II, and
at least one compound selected from the formulae V to IX

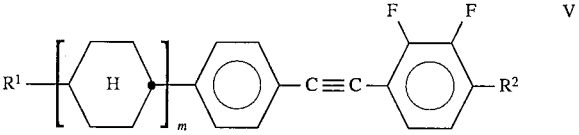

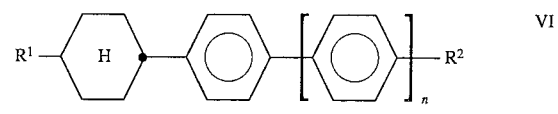

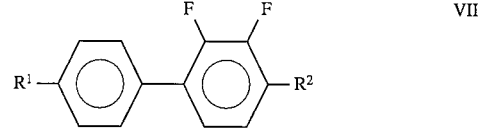

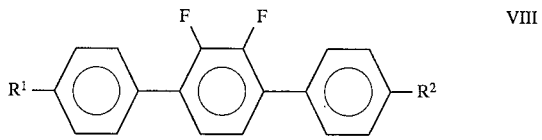

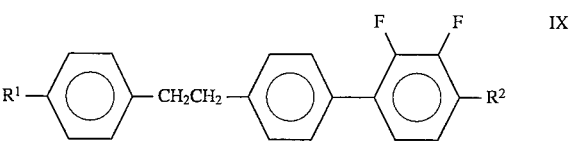

in which $R^1$ and $R^2$ are as defined above, and m and n are each 0 or 1.

In particular, the media essentially comprise
one or more compounds of the formula I, one or more compounds of the formula II,
one or more compounds of the formulae V to IX, and
one or more compounds of the formula VI.

Media containing compounds of the formula V in which m is 0 and compounds of the formula V in which m is 1 are particularly preferred.

Media containing one or more compounds of the formulae V to IX generally have birefringence values of between 0.10 and 0.20, preferably between 0.11 and 0.16.

In a particularly preferred embodiment, the media according to the invention essentially comprise:

10–25% by weight of one or more compounds of the formula I,
20–40% by weight of one or more compounds of the formula II,
20–40% by weight of one or more compounds of the formula V and
15–35% by weight of one or more compounds of the formula VI.

The dielectrics may also contain further additives known to the person skilled in the art and described in the literature. For example, 0–15% of pleochroic dyes can be added, furthermore conductive salts, preferably ethyldimethyldodecylammonium 4-hexoxybenzoate, tetrabutylammoniumtetraphenylborate or complex salts of crown ethers (cf. for example, Haller et al., Mol. Cryst. Liq. Cryst. Volume 24, pages 249–258 (1973)) in order to improve the conductivity or substances can be added in order to modify the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728.

The individual components of the formulae I to III of the liquid-crystal phases according to the invention are either known or their methods of preparation can easily be derived from the prior art by a person skilled in the relevant art, since they are based on standard methods described in the literature.

Corresponding compounds of the formulae I and II are described, for example, in WO 89-08633.

Corresponding compounds of the formula III are described, for example, in DE 33 21 373.

Corresponding compounds of the formula V are described, for example, in WO 88/07514.

The compounds of the formula VI are described, for example, in DE 26 36 684 (n=0) or DE 29 27 277 (n=1).

The nematic liquid-crystal mixtures of the displays according to the invention preferably contain at least 10% of compounds of the formula I, particularly preferably from 15 to 30% of compounds of the formula I.

The nematic liquid-crystal mixtures in the displays according to the invention generally contain two components A and B, which themselves comprise one or more individual compounds.

Component A has a significantly negative dielectric anisotropy and gives the nematic phase a dielectric anisotropy of <−0.3. It preferably contains compounds of the formulae I and II.

The proportion of component A is between 45 and 100%.

One (or more) individual compounds which have a $\Delta\epsilon$ value of <−0.8 are preferably selected for component A. This value must be more negative the smaller the proportion of A in the mixture as a whole.

Component B has pronounced nematogeneity and a viscosity of not more than 30 $mm^2s^{-1}$, preferably not more than 25 $mm^2s^{-1}$ at 20° C.

Particularly preferred individual compounds of component B are extremely low-viscosity nematic liquid crystals having a viscosity of not more than 18 $mm^2s^{-1}$, preferably not more than 12 $mm^2s^{-1}$ at 20° C. Component B is monotropic- or enantiotropic-nematic, has no smectic phases and can prevent the occurrence of smectic phases in liquid-crystal mixtures down to very low temperatures. For example, if various materials of high nematogeneity are added to a smectic liquid-crystal mixture, the nematogeneity of these materials can be compared by means of the resulting degree of suppression of smectic phases.

A multiplicity of suitable materials are known to the person skilled in the art from the literature. Particular preference is given to the compounds of the formula III.

In addition, these liquid-crystal phases can also contain more than 18 components, preferably from 18 to 25 components.

The phases preferably contain 4 to 15, in particular 5 to 12, compounds of the formulae I, II and III or I, II, V and VI.

In addition to compounds of the formulae I to IX, other constituents may also be present, for example in an amount of up to 45% of the mixture as a whole, but preferably up to 34%, in particular up to 10%.

The, other constituents are preferably selected from nematic or nematogenic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as components of liquid-crystalline phases of this type can be characterized by the formula IV

$$R^3—L—G—E—R^4 \qquad IV$$

in which L and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydro-naphthalene, quinazoline and tetrahydroquinazoline,

| G is | —CH=CH— | —N(O)=N— |
|------|---------|----------|
|      | —CH—CQ— | —CH=N(O)— |
|      | —CC—    | —CH$_2$—CH$_2$— |
|      | —CO—O—  | —CH$_2$—O— |
|      | —CO—S—  | —CH$_2$—S— |
|      | —CH=N—  | —COO—Phe—COO— | or a C-C single bond, Q is halogen, preferably chlorine, or —CN, and $R^3$ and $R^4$ are each alkyl, alkoxy, alkanoyloxy or alkoxycarbonyloxy having up to 18, preferably up to 8 carbon atoms, or one of these radicals is alternatively CN, NC, NO$_2$, CF$_3$, F, Cl or Br.

In most of these compounds $R^3$ and $R^4$ are different from one another, one of these radicals usually being an alkyl or alkoxy group. Other variants of the proposed substituents are also common. Many such substances or mixtures thereof are commercially available. All these substances can be prepared by methods which are known from the literature.

The media according to the invention may furthermore contain one or more dyes.

The structure of the liquid-crystal displays according to the invention corresponds to the conventional geometry, as described, for example, in EP-A 0 240 379.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German Patent Application P 44 26 798.3 combined with German Patent Applications P 44 28 478.0 and P 44 44 813.9, are hereby incorporated by reference.

The following abbreviations are used:

PCHnOmFF, CCPnOmFF, CCPnmFF, D-nOmFF, CBCnmF, CCHnOm, CCHnm, CPnOmFF, CHnm, BCNnm, PTP-nOmFF, CPTP-nOmFF, PCH-nOm, PCH-nm, BCH-nm, T-nFFm, B-nOmFF, ET-nOmFF

The threshold voltage values V(0,0), V(10,0) and V(90,0) stated were measured in a conventional ECB cell having a layer thickness of 5 µm at 20° C.

In addition:

| | |
|---|---|
| V(0,0) | denotes the treshold voltage [V] at 0% transmission, viewing angle 0° |
| V(10,0) | denotes the threshold voltage [V] at 10% transmission, viewing angle 0° |
| V(90,0) | denotes the threshold voltage [V] at 90% transmission, viewing angle 0° |
| $\Delta n$ | denotes the optical anisotropy measured at 20° C. and 589 nm |
| $\Delta \epsilon$ | denotes the dielectric anisotropy at 20° C. |
| cp | denotes the clearing point [°C.] |
| S | denotes the steepness of the characteristic line $S = \frac{V(90,0)}{V(10,0)} - 1 \cdot 100$ |
| HR (20) | denotes the voltage holding ratio at 20° C. [%] |
| HR (100) | denotes the voltage holding ratio at 100° C. [%] |
| HR (UV) | denotes the voltage holding ratio after UV irradiation [%] |

The display used for measurement of the threshold voltage has two plane-parallel outer plates at a separation of 5 m and, on the inside of the outer plates, electrode layers with lecithin alignment layers on top which cause a homeotropic alignment of the liquid crystals.

EXAMPLE 1

A mixture is prepared which comprises

| | |
|---|---|
| PCH-302FF | 9.00 |
| PCH-502FF | 9.00 |
| CCP-302FF | 12.00 |
| CCP-502FF | 14.00 |
| CCP-32FF | 25.00 |
| CCH-34 | 10.00 |
| CCH-32 | 5.00 |
| CCH-301 | 5.00 |
| CCH-303 | 6.00 |
| CCH-501 | 5.00 | whose physical data are shown in Table I.

TABLE I

| | |
|---|---|
| cp | +86° C. |
| $\Delta n$ | +0.0766 |

TABLE I-continued

| | |
|---|---|
| $\Delta\epsilon$ | −3.4 |
| $\epsilon_\parallel$ | 3.4 |
| $\epsilon_\perp$ | 6.8 |
| V(10,0) | 2.24(DAP) |
| HR(20) | 98.4 |
| HR(100) | 83.3 |
| HR(UV) | 86.4 |

EXAMPLE 2

A liquid-crystalline phase is prepared which comprises

| | |
|---|---|
| PCH-302FF | 12.00 |
| PCH-502FF | 11.00 |
| CCP-302FF | 14.00 |
| CCP-502FF | 15.00 |
| CCP-32FF | 24.00 |
| CCH-34 | 6.00 |
| CCH-32 | 5.00 |
| CCH-301 | 4.00 |
| CCH-303 | 5.00 |
| CCH-501 | 4.00 | whose physical data are shown in Table II.

TABLE II

| | |
|---|---|
| cp | +86° C. |
| $\Delta n$ | 0.0804 |
| $\Delta\epsilon$ | −4.0 |
| $\epsilon_\parallel$ | 3.6 |
| $\epsilon_\perp$ | 7.6 |
| V(10,0) | 2.08(DAP) |
| HR(20) | 97.6 |
| HR(100) | 80.1 |
| HR(UV) | 91.6 |

COMPARATIVE EXAMPLE

A liquid-crystalline phase is prepared which comprises

| | |
|---|---|
| D-302FF | 8.00 |
| D-402FF | 8.00 |
| D-502FF | 8.00 |
| PCH-301 | 10.00 |
| CCH-303 | 15.00 |
| CCH-501 | 12.00 |
| CP-402FF | 4.00 |
| CP-502FF | 4.00 |
| CH-33 | 4.00 |
| CH-35 | 4.00 |
| CH-43 | 4.00 |
| CH-45 | 4.00 |
| BCN-55 | 11.00 | whose physical data are shown in Table III.

TABLE III

| | |
|---|---|
| cp | +98° C. |
| $\Delta n$ | 0.0678 |
| $\Delta\epsilon$ | −3.5 |
| $\epsilon_\parallel$ | 3.5 |
| $\epsilon_\perp$ | 7.0 |
| V(10,0) | 2.32(DAP) |
| HR(20) | 97.3 |
| HR(100) | 67.2 |
| HR(UV) | 74.4 |

EXAMPLE 3

A liquid-crystalline phase is prepared:

| | | | |
|---|---|---|---|
| PCH-302FF | 10.00 | cp | +86° C. |
| PCH-502FF | 10.00 | $\Delta n$ | 0.0765 |
| CCP-302FF | 12.00 | $\Delta\epsilon$ | −3.3 |
| CCP-502FF | 13.00 | $\epsilon_\perp$ | 6.6 |
| CCP-21FF | 4.00 | $\epsilon_\parallel$ | 3.4 |
| CCP-22FF | 4.00 | | |
| CH-33 | 5.00 | | |
| CH-35 | 5.00 | | |
| CH-43 | 5.00 | | |
| CCH-34 | 5.00 | | |
| CCH-35 | 5.00 | | |
| CCH-301 | 6.00 | | |
| CCH-303 | 6.00 | | |
| PCH-301 | 5.00 | | |
| PCH-302 | 5.00 | | |

EXAMPLE 4

A liquid-crystalline phase is prepared:

| | |
|---|---|
| PCH-302FF | 8.00% |
| PCH-502FF | 8.00% |
| CCP-302FF | 12.00% |
| CCP-502FF | 8.00% |
| CCP-21FF | 5.00% |
| CCP-31FF | 5.00% |
| PCH-302 | 10.00% |
| CPTP-302FF | 5.00% |
| CPTP-502FF | 5.00% |
| PTP-302FF | 9.00% |
| PTP-502FF | 9.00% |
| BCH-32 | 6.00% |
| PCH-53 | 10.00% | whose physical properties are given in Table IV:

TABLE IV

| | |
|---|---|
| cp | +85° C. |
| $\Delta n$ | +0.1501 |
| $\Delta\epsilon$ | −4.21 |
| $\epsilon_\parallel$ | 3.74 |
| $\epsilon_\perp$ | 7.95 |
| V(10,0) | 2.24(DAP) |

EXAMPLE 5

A liquid-crystalline phase is prepared which comprises

| | |
|---|---|
| PCH-302FF | 12.00 |
| PCH-502FF | 11.00 |
| CCP-302FF | 14.00 |
| CCP-502FF | 15.00 |
| CCP-32FF | 24.00 |
| CCH-34 | 6.00 |
| CCH-35 | 5.00 |
| CCH-301 | 4.00 |
| CCH-303 | 5.00 |
| CCH-501 | 4.00 | whose physical data are shown in Table V.

TABLE V

| | |
|---|---|
| cp | +89° C. |
| $\Delta n$ | 0.0812 |
| $\Delta\epsilon$ | −4.07 |
| $\epsilon_\parallel$ | 3.56 |
| $\epsilon_\perp$ | 7.62 |

TABLE V-continued

| | |
|---|---|
| V(10,0) | 2.12(DAP) |
| HR(20) | 97.8 |
| HR(100) | 80.5 |
| HR(UV) | 91.9 |

EXAMPLE 6

A liquid-crystalline phase is prepared which comprises

| | |
|---|---|
| PCH-302FF | 12.00 |
| PCH-502FF | 11.00 |
| CCP-302FF | 14.00 |
| CCP-502FF | 15.00 |
| CCP-31FF | 14.00 |
| CCP-22FF | 10.00 |
| CCH-34 | 6.00 |
| CCH-35 | 5.00 |
| CCH-301 | 4.00 |
| CCH-303 | 5.00 |
| CCH-501 | 4.00 | whose physical data are shown in Table VI.

TABLE VI

| | |
|---|---|
| cp | +88° C. |
| Δn | 0.0819 |
| Δε | −4.1 |
| $\varepsilon_\parallel$ | 3.6 |
| $\varepsilon_\perp$ | 7.7 |
| V(10,0) | 2.13(DAP) |
| HR(20) | 98.6 |
| HR(100) | 81.1 |
| HR(UV) | 92.6 |

EXAMPLE 7

A liquid-crystalline phase is prepared:

| | | | |
|---|---|---|---|
| PCH-302FF | 10.00 | cp | +74° C. |
| PCH-502FF | 8.00 | Δn | +0.1282 |
| CCP-302FF | 12.00 | Δε | −4.1 |
| CCP-502FF | 8.00 | $\varepsilon_\parallel$ | 3.8 |
| CCP-21FF | 5.00 | $\varepsilon_\perp$ | 7.9 |
| CCP-31FF | 5.00 | $V_{(10,0)}$ | 2.19(DAP) |
| PCH-302 | 10.00 | | |
| BCH-32 | 6.00 | | |
| PCH-53 | 8.00 | | |
| T-3FF3 | 8.00 | | |
| ET-502FF | 10.00 | | |
| B-502FF | 10.00 | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. Liquid-crystalline medium based on a mixture of polar compounds having negative dielectric anisotropy, having a birefringence between 0.04 and 0.10, comprising at least 1 compound of the formula I

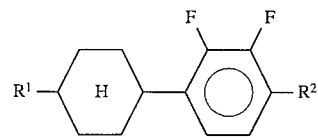

with a total of 4 or more compounds selected from formulae I and II

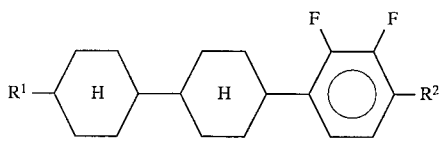

and a total of two or more compounds of formula III

in which $R^1$ and $R^2$ are each, independently of one another,
H, an unsubstituted alkyl or alkenyl radical having up to 18 carbon atoms in which one or more non-adjacent $CH_2$ groups may be replaced by a radical selected from the group consisting of —O—, —S— and —C≡C—.

2. Liquid-crystalline medium according to claim 1, which contains one or more compounds of the formula II:

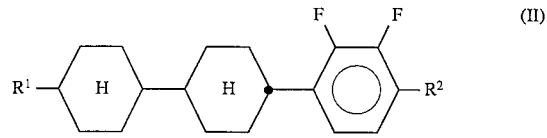

in which $R^1$ and $R^2$ are as defined in claim 1.

3. Liquid-crystalline medium according to claim 1, characterized in that it contains at least 2 compounds of the formula I.

4. Liquid-crystalline medium according to one of claim 1, characterized in that the proportion of compounds of the formula I in the mixture as a whole is at least 15% by weight.

5. Liquid-crystalline medium according to one of claim 2, characterized in that the proportion of compounds of the formula II in the mixture as a whole is at least 30% by weight.

6. Liquid-crystalline medium according to claim 1, characterized in that the proportion of compounds of the formula III in the mixture as a whole is from 10 to 50% by weight.

7. Liquid-crystalline medium according to claim 1, characterized in that it contains at least 3 compounds selected from the formulae IIIa and IIIb

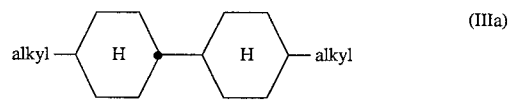

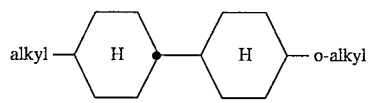

in which
alkyl is $C_{1-6}$-alkyl.

8. Liquid-crystalline medium according to claim 7, characterized in that it contains at least 1 compound of the formula IIIa and at least 1 compound of the formula IIIb.

9. Liquid-crystalline medium according to claim 1, characterized in that it essentially comprises 15–30% by weight of one or more compounds of the formula I, 30–70 % by weight of one or more compounds of the formula II and 10–50% by weight of one or more compounds of the formula III.

10. Liquid-crystalline medium according to claim 1, characterized in that it additionally contains one or more compounds selected from the formulae V to IX:

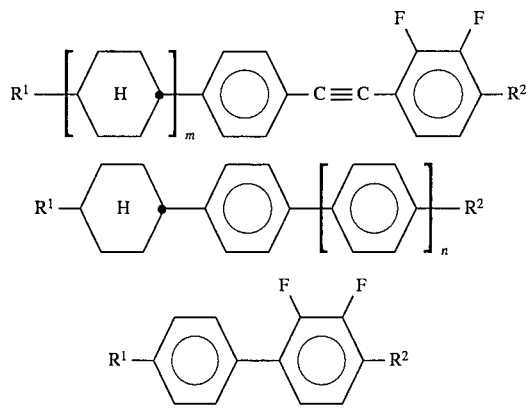

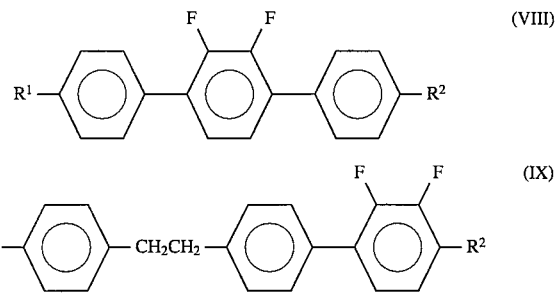

in which $R^1$ and $R^2$ are as defined in claim 1, and m and n are each 0 or 1.

11. Electro-optical display having active matrix addressing based on the ECB effect, characterized in that it contains, as dielectric, a liquid-crystalline medium according to claim 1.

12. Liquid crystalline medium according to claim 1 in which the birefringence is between 0.05 and 0.09.

13. Liquid crystalline medium according to claim 1 in which the dielectric anisotropy is between −0.5 and −b 5.

14. Liquid crystalline medium according to claim 13 in which the dielectric anisotropy is between −3.0 and −4.5.

* * * * *